United States Patent Office 3,432,455
Patented Mar. 11, 1969

3,432,455
EMULSION POLYMERIZATION OF UNSATURATED MONOMERS
Vincent M. Rasicci, Avon Lake, Ohio, assignor to Standard Brands Chemical Industries, Inc., Dover, Del., a corporation of Delaware
No Drawing. Continuation-in-part of application Ser. No. 292,445, July 2, 1963. This application Feb. 8, 1967, Ser. No. 614,564
U.S. Cl. 260—29.7         18 Claims
Int. Cl. C08d 1/09; C08f 1/13

ABSTRACT OF THE DISCLOSURE

A process for producing synthetic polymer latex having low viscosity and a large particle size in which unsaturated monomers are polymerized in an aqueous emulsion containing cations of certain polyvalent metals and an anionic surfactant, and the latex obtained thereby.

To produce a particularly stable latex, the emulsion is preferably prepared by use of limited amounts of an emulsifier which is a soluble salt of the polyvalent metal and the anionic surfactant. The emulsion may also be prepared by the use of limited amounts of an inorganic salt of the polyvalent metal and an emulsifier containing the anionic surfactant, but a less stable latex is produced.

---

This application is a continuation-in-part of copending application Ser. No. 292,445 filed on July 2, 1963 and now abandoned.

This invention relates to emulsion polymerization of unsaturated monomers, and in particular to aqueous emulsion polymerization in which polyvalent metal emulsifiers are used to produce synthetic polymer latices having a large particle size.

The unsaturated monomers to which the invention pertains are those containing at least one carbon to carbon double bond and capable of polymerizing in aqueous emulsion. Such unsaturated monomers may be polymerized in accordance with the invention as homopolymers or as copolymers, including terpolymers, tetrapolymers, or other multipolymers.

Due to a predominance of larger particles, the polymer latices prepared according to the invention have lower viscosities at given solids contents than polymer latices prepared with conventional monovalent metal or ammonium salt emulsifiers. These latices because of this predominance of large particles may be concentrated to higher solids contents without encountering excessively high viscosities. They are therefore suitable for many applications where high solids content, or larger particle sizes and low viscosities, are desirable.

In accordance with the invention, it has been found that synthetic polymer latices having larger particle size and lower viscosities at a given solids content can be produced by emulsion polymerization of ethylenically unsaturated monomers in aqueous media containing as emulsifiers, bivalent metal salts of anionic surfactants in place of conventional monovalent salt emulsifiers.

More particularly, it has been found that limited amounts of the bivalent metal emulsifiers, i.e., from about 0.5 to about 7.0 parts and preferably to about 5.0 parts of emulsifier per 100 parts of monomer, are necessary in the emulsion polymerization of unsaturated monomers to obtain latices having larger particle sizes and lower viscosities. When greater amounts of emulsifier are employed, the resulting latices may have about the same or somewhat lower viscosities, but the particle size is significantly smaller. Also, films, sheets, coatings and the like products obtained from latices having a higher emulsifier content will exhibit greater water sensitivity and often will be unsuitable for many applications.

Advantageously, the polymerization may be completed within relatively short reaction times, that is, the rates of reaction are comparable to those in conventional polymerizations of the same monomers with monovalent metal salt emulsifiers. Thus, the process of the invention may be carried out so as to produce high percent conversions of the monomers to polymer without extending the reaction time.

The process of this invention can be employed to polymerize a wide variety of ethylenically unsaturated monomers. In general, any unsaturated ethylenic monomeric compound which is polymerizable in aqueous emulsion either with itself or with one or more different ethylenic compounds may be used to provide the improved polymeric latices of this invention. Exemplary of these polymerizable ethylenic compounds are the conjugated dienes and the monoethylenically unsaturated compounds such as the vinyl aromatic compounds, the alpha methylene carboxylic acids and esters, nitriles, aldehydes, ketones, and amides thereof, the vinyl aliphatic compounds, the vinylidene compounds, $\alpha,\beta$-ethylenically unsaturated di- and polycarboxylic acids, and their full and partial esters, the methylene hydrocarbons, and the like. Suitable dienes are butadiene-1,3; isoprene; 2,3-dimethyl butadiene-1,3; piperylene; 2-chlorobutadiene-1,3; 2,3-dichlorobutadiene-1,3; 2-bromobutadiene-1,3; 2-fluorobutadiene-1,3; 2,3-difluorobutadiene-1,3; and the like. Suitable vinyl aromatic compounds are styrene, vinyl toluene, divinyl benzene, the nuclearly substituted styrenes such as the chlorostyrenes and alkyl styrenes, alpha-chlorostyrene, alpha-methylstyrene, vinyl naphthalene, vinyl pyridine, vinyl carbazole and the like. Examples of various of the alpha methylene compounds are acrylic acid, acrylamide, methyl acrylate, methyl methacrylate, methacrylic acid, methacrylamide, acrolein, acrylonitrile, methacrylonitrile and the like. Examples of polycarboxylic acids are maleic and fumaric acids, and the mono- or di-esters with alcohols preferably of from 1 to 12 carbon atoms. Vinyl aliphatic compounds include vinyl chloride, vinyl bromide, vinyl fluoride, vinyl acetate, vinyl propionate, vinyl formate, vinyl methyl ether, vinyl ethyl ether, vinyl methyl ketone, vinyl ethyl ketone, vinyl isobutyl ketone, divinyl ketone, vinyl ethyl sulfone, the vinyl thioethers, and the like. Suitable vinylidene compounds are vinylidene fluoride, 1-chloro-1-fluoro-ethene, vinylidene cyanide, and the like. Representative of the alpha methylene hydrocarbons are isobutene, ethylene and propylene. Polymerizable halo-ethylenes, such as chloro-trifluoroethylene, are also suitable monomers. These polymerizable monomers may be homopolymerized or copolymerized to form latices of homopolymers, copolymers, terpolymers, tetrapolymers and other multipolymers.

The preferred bivalent metal emulsifiers of the invention are salts formed by metals of Group II of the Periodic Table with organic anionic surfactants. Such surfactants as is well known are characterized by anions having a long chain hydrophobic organic structure and one or more hydrophilic groups. Thus, the invention includes any anionic surfactant which has at least limited water solubility in bivalent metal salt form and is capable of supporting emulsion polymerization. Only those bivalent metal salts which are insoluble or which would inhibit the polymerization are excluded. For example, bivalent metal soaps of fatty acids which are insoluble are excluded. It is the bivalent metal and not the specific anionic structure of the surfactant which is essential to the result. Among exemplary groups of emulsifiers are the sulfuric esters and derivatives represented by the following general formula:

(I)   $M(SO_3O[A]_nR)_x$ wherein M is a bivalent metal cation (e.g., Ca, Mg, Zn, and other bivalent metals); $x$ is 2; A is —CH$_2$CH$_2$O—, —CH$_2$CHOHCH$_2$OOC—, or —R'NHOC—, (R' being an alkylene group containing 1 to 20 carbon atoms); $n$ equals 0, or 1 (when A is either —CH$_2$CHOHCH$_2$OOC—, or —R'NHOC—), or 1 to 50 (when A is —CH$_2$CH$_2$O—); and R is an alkyl group, an alkylaryl group or a dialkylaryl group, the alkyl group containing from 8 to 20 carbon atoms.

Another exemplary group of emulsifiers includes those derived from alkyl aryl sulfonic acids and may be represented by the following general formula:

(II)   $M(SO_3B_yR_1)_x$ wherein M and $x$ are as designated in Formula (I) above; B is —CH$_2$CH$_2$O—; $R_1$ is an alkylaryl group, the alkyl portion of which contains from 8 to 20 carbon atoms and the aryl portion being mono- or polycyclic; and $y$ equals 0 to 50.

In addition to the emulsifiers exemplified by the general formulas above, many other types known to the art may be mentioned as suitable. These include but are not limited to alkane sulfonic acids, such as long chain alkyl sulfonic acids, and their ether, carboxylic ester and amide derivatives; sulfonates of succinic acid esters with long chain alcohols; and alkyl and alkylaryl phosphinates (R—P—O—). Any bivalent metals, particularly Group II metals, are suitable for use in preparing the emulsifiers of the present invention as long as they form water soluble compounds with the surface-active anion selected and do not poison the polymerization. Preferred metals because of economy and availability are calcium, magnesium and zinc.

It should be pointed out that the process of the invention requires bivalent metal cations in order to obtain the desired results of low viscosity and large particle size latex. Their introducion into the system as all or part of the emulsifier, that is, as a salt of the anionic surfactant, is much preferred. However, the bivalent metal cations may be introduced as soluble inorganic salts (referred to as electrolyte) together with a sufficient amount of an anionic surfactant and similar results are obtained. It will be appreciated that addition of an electrolyte has the disadvantage of increasing the total ionic concentration in the emulsion system and tends to make the latex less stable and decreases the wash resistance of films and the like products produced from the latex.

In accordance with this invention, it has been found that when bivalent metal cations are introduced into the aqueous emulsion polymerization system in the form of water soluble salts, that is, as electrolytes, the amount of the electrolyte must be kept within certain limits in order to avoid gellation, increase in the viscosity, and/or the occurrence of excessive prefloc in the resulting latex. Generally the amount of electrolyte added must not exceed about 1.0 part per 100 parts of monomer, and preferably is in the range of from about 0.4 to about 0.85 part per 100 parts of monomer. (Based on the weight of the water in the aqueous emulsion, the concentration of the electrolyte added is not greater than about one percent.) When bivalent metal emulsifiers are available and are used to form the aqueous emulsion, it is preferable not to add any bivalent metal cations in the form of electrolyte, since as heretofore mentioned, the presence of electrolyte tends to form less stable latices. It will be appreciated, however, that minor amounts of the bivalent metal electrolyte may be present in the emulsion without adversely affecting the large particle sizes and low viscosities of the latices obtained by the process of his invention.

Polymerization of the unsaturated monomers by this process may be effected at temperatures from about 5° to about 100° C.; preferably temperatures of from 50° to 75° C. are employed. The lower temperatures are generally used with the peroxide type catalyst since temperatures of about 35° to 40° C. are necessary to initiate polymerization with persulfate type catalysts.

It will be appreciated that the low viscosity of the resulting latices provides better heat transfer and hence allows greater control of the temperature of the reaction. Thus, localized hot spots are prevented from causing rapid acceleration of the polymerization and the polymer is polymerized under more uniform temperature conditions.

The usual catalysts or promoters and activators, as well as the other additives conventionally employed in emulsion polymerization, may be used in the process of this invention. Thus, the present process is similar to other emulsion polymerization processes in that it is initiated by a free radical producing agent like the peroxygen compounds including the alkali metal or ammonium persulfates or perborates, both organic and inorganic peroxides such as benzoyl peroxide, di-t-butyl peroxide, hydrogen peroxide, and the hydroperoxides, such as cumene hydroperoxide, diisopropylbenzene hydroperoxide, and the like catalysts. In general, these catalysts are used in small amounts, e.g., from about 0.05 to about 3.0 percent by weight (based on the monomer charge).

Additional auxiliary activators are employed in conventional redox systems to provide the necessary free radicals for this process. These auxiliary activators are reducing agents which react with the peroxide compound to form one or more free radicals. Exemplary of such activators include ferrous salts with or without sugars (e.g. sorbose) or diols (e.g. dihydroxy acetone), formaldehyde sulfoxylates, or polyamine compounds (e.g. diethylene triamine and other polyalkylene polyamines). Also, it may be desirable to have modifiers or chain transfer agents within the polymerization system to control the molecular weight and consequently the physical properties of the resulting polymers. These modifiers include mercaptans having from 6 to 20 carbon atoms (e.g. dodecyl mercaptan, t-hexadecyl mercaptan and mixtures of primary and tertiary mercaptans), thiuram disulfides, and xanthic disulfides. The amount of modifier used usually extends from about 0.1 to about 2.0 percent by weight of the monomer charge. It will be appreciated that the selection of modifier, catalyst, activator and emulsifier, as well as the quantities of each, is dependent on the monomer charge to be polymerized and the desired properties of the latex to be formed.

The polymerization of the ethylenically unsaturated monomers may be controlled so that the termination of the reaction can be effected at the optimal degree of conversion and crosslinking of the polymer. Such control is obtained by introducing a shortstopping agent, such as salts of dimethyldithiocarbamic acid, hydroquinone and others well known in the art, into the polymerization system when the desired degree of conversion has been reached.

After the reaction is terminated, the resulting latex can be readily concentrated by conventional techniques, such as stripping, to form a high solids latex. Generally, the stripped latex will have a solids content of about 55 percent or more. It will be appreciated that in this manner the present process provides a more desirable product and effects more efficient polymerization of the unsaturated monomers.

Before or after stripping of unreacted monomers and other volatile products, the latex may be stabilized against degradation by the addition of antioxidants. Also, other compounding additives such as carbon black, silica, sulfur, oils or plasticizers may be incorporated into the latex, depending upon whether it is intended for use as a latex or is to be coagulated and used in a dry rubber compound. Coagulation is generally accomplished by salt, acid, or acidified salt solutions.

A variety of finished products may be produced from the resulting latex. Because the latices made by this invention exhibit outstanding foam stability they are very useful in making foam products. Also, due to their ability to form high solids latices they are useful in making dipped goods, such as gloves, girdles, and the like. Other uses of the latices include formation of paper coatings, sheets, films, paints and other polymer products, particularly where high solids contents are advantageous.

The polyvalent metal emulsifiers of this invention may be used alone or with other emulsifying agents to increase the particle size and to reduce the viscosity of latex formed by polymerization of ethylenically unsaturated monomers in an aqueous emulsion. It will be understood, as heretofore described, that the total amount of emulsifier used in the aqueous emulsion should not exceed about 7.0 parts per 100 parts of monomer in order to obtain the latices having the preferred larger particle sizes, i.e., diameters from about 1000 A. to 3000 A. or higher.

The particular monomers employed, the amounts of each, the amount of water, the particular type of emulsifier, that is the anionic portion thereof, the pH and temperature of polymerization, and the percentage of monomer conversion, may all be varied in accordance with the knowledge of those skilled in the art.

The invention is described in greater detail in the following examples which are illustrative of complete specific embodiments thereof, but which are not to be construed as limiting the invention.

In the examples, several latices were prepared using variations within the following general recipe. All amounts are given as parts by weight.

| | |
|---|---|
| Monomers | 100 |
| Water | 100–150 |
| Emulsifier | 0.5–10.0 |
| Catalyst (e.g., $K_2S_2O_8$) | 0.025–0.075 |
| Modifier | 0.1–1.5 |
| Chelating agent (ethylene diamine tetraacetic acid) | 0.01–0.05 |
| Electrolyte (e.g, $MgCl_2$) | 0–7.0 |

Copolymers of butadiene and styrene, and terpolymers of butadiene and styrene with methacrylic acid, fumaric acid, and itaconic acid were prepared in an aqueous emulsion utilizing various polyvalent metal anionic surfactants such as magnesium and zinc lauryl sulfates, as well as polyetherified derivatives of magnesium lauryl sulfates formed by addition of certain mole quantities of ethylene oxide to lauryl alcohol. Magnesium dodecylbenzene sulfonate, and aluminum, calcium, magnesium and tin (stannic) tridecyl ether sulfates were also employed as polyvalent metal emulsifiers. In addition, like polymerizations were conducted with corresponding monovalent metal emulsifiers including sodium lauryl sulfate, sodium dodecylbenzene sulfonate, and sodium tridecyl ether sulfate to provide comparative results and to illustrate the improved properties exhibited by the latices of this invention.

In general, the following procedures and operating conditions were used with the above recipe in the specific examples given below.

A solution of the emulsifier in water was place in a reaction vessel and additional water containing the other water soluble ingredient (including an electrolyte in some cases) was added in the required amount. The modifier was added as a solution in a portion of the styrene or other liquid non-volatile monomer. The remaining portions of the styrene and other non-volatile monomers, if any, were then added to the reaction mixture. The reaction vessel was purged with nitrogen to expel any air present and liquid butadiene was added to the vessel. The vessel was then sealed and heated to 55° to 65° C. with agitation to form an aqueous emulsion.

Polymerization was continued for the time required to reach the desired degree of conversion, usually several hours, as determined by conventional sampling, measuring, and calculating techniques. Then the reaction was stopped with a salt of dimethyldithiocarbamate (from about 0.1 to 0.2 part of the shortstop per 100 parts monomers being required).

The solids content, size and size distribution of particles, and viscosity of the resulting latex were measured, and in some cases gel content and swell ratio were determined. Viscosity measurements were conducted with a Brookfield viscometer (type LVF) the spindle and speeds of rotation being varied to accommodate different latex viscosities. Electron micrographs were made of samples of the latices and the particle sizes and size distributions were determined by measurement on the micrographs.

EXAMPLE I

A monomeric mixture of 46 parts butadiene, 52 parts styrene, and 2 parts fumaric acid was polymerized using the above designated recipe at an acid pH with 3.0 parts of magnesium lauryl sulfate as emulsifier, and 0.9 part of t-hexadecyl mercaptan as modifier. Three other polymerizations with the same monomer mixture were conducted using 3.0 parts by weight of magnesium lauryl ether sulfates containing 3.5, 7.0 or 27 moles of ethylene oxide per mole of the sulfate. An identical monomer mixture was also polymerized in an emulsion formed with 3.0 parts by weight of sodium lauryl sulfate. All other ingredients of the recipe were the same in each of these polymerizations. The temperature of polymerization was maintained at 60° to 65° C.

After twelve hours reaction time the polymerizations were shortstopped and samples of the resulting latices were tested to determine their properties, particularly viscosity and particle size. As shown in Table 1, use of magnesium lauryl sulfate and its ether derivatives produced latices having much lower viscosities and larger particle size than that of the latext produced with the monovalent metal counterpart of the emulsifier.

TABLE 1

| | 1 | 2 | 3 | 4 | 5 |
|---|---|---|---|---|---|
| | Mg Lauryl Sulfate | Mg Lauryl Ether Sulfate | | | Na Lauryl Sulfate |
| | | 3.5 E.O.[1] | 7.9 E.O. | 27 E.O. | |
| Size of Latex Particles, Diameters in A | 1,446–2,169 | 1,205–1,928 | 1,080–1,810 | 1,080–1,687 | 241–964 |
| Viscosity:[2] | | | | | |
| 69 r.p.m | 27.6 | 40.5 | 40.5 | 32.5 | 4,800 |
| 12 r.p.m | 27 | 41 | 40 | 32 | 29,000 |
| Percent Gel[3] | 47.4 | 65.5 | 73.7 | 73.8 | 88.2 |
| Swell Ratio[3] | 35.0 | 34.9 | 41.2 | 26.3 | 19.6 |
| pH | 2.7 | 2.8 | 2.7 | 2.8 | 3.1 |
| Percent Total Solids | 41.6 | 43.5 | 43.7 | 42.4 | 44.8 |
| Percent Conversion | 89.6 | 94.4 | 95.6 | 94.7 | 98.0 |

[1] Moles of ethylene oxide per mole of magnesium.
[2] Centipoises.
[3] In benzene at 25° C.

The above data show that the latices of Runs 1 to 4, inclusive, produced with the polyvalent metal surfactants were highly fluid, while that produced with the monovalent sodium lauryl sulfate under otherwise identical conditions was viscous. The latices produced in accordance with this invention had viscosities that ranged from 27 to 41 centipoises at a spindle speed of 12 r.p.m., whereas the viscosity of latex produced with the sodium emulsifier was 20,000 centipoises.

Noteworthy is the fact that the particle size range of the latices of Runs 1 to 4 shows substantially no overlap with the size range of the latex of Run 5. In other words, the smallest particles of the latices or Runs 1 to 4 were larger than the largest particles of the latex of Run 5. Also, it will be noted that the total solids content and the percent conversion achieved in these latices are substantially the same as produced by the sodium lauryl sulfate. The equal degrees of conversion indicate that the reaction rates are comparable, since the polymerization times were substantially the same.

It is a further advantage that such results are accomplished without addition of inorganic salts (electrolyte) in the recipe. Such salts are often used in polymerization to control viscosity, but increase the total ionic content of the system and this tends to destabilize and cause floc formation in the latex.

EXAMPLE II

To further illustrate the effect of the present process on the latex viscosity, additional terpolymers of butadiene, styrene and fumaric acid were copolymerized by the above described procedure in emulsions containing varying amounts of sodium tridecyl ether sulfate and magnesium lauryl sulfate. The recipes were substantially the same as those of Example I except that 50 parts of butadiene, 48 parts of styrene and 2 parts of fumaric acid were used and the total amount of emulsifier was increased to 4.0 parts. Polymerization was effected for 10 hours at It will be noted that the degrees of conversion of the latices of Runs 1 and 5 are the same, but that the viscosities of these latices are vastly different, the viscosity of the latex produced with the magnesium emulsifier being less than 1/100 of that prepared with the sodium emulsifier. Also, the viscosity-reducing effect of using part polyvalent and part monovalent metal emulsifiers is shown in Runs 2, 3 and 4. Even a small portion of the magnesium lauryl sulfate (one-fourth of the total emulsifier or as little as 1.0 part) reduces the viscosity of the latex by about one half. Consequently, the invention provides a means of control of viscosity so that intermediate values may be obtained by using both types of emulsifiers, i.e., polyvalent and monovalent metal salts.

EXAMPLE III

Using the previously described polymerization procedure and the general recipe, with 3.0 parts of magnesium lauryl sulfate, latices of three acidic terpolymers were prepared by acid polymerization of 50 parts each of butadiene, 48 parts each of styrene, with 2 parts of fumaric acid, 2 parts of itaconic acid, and 2 parts of methacrylic acid, respectively, and one copolymer latex was prepared by alkaline polymerization of 50 parts butadiene and 50 parts styrene. Also, four latices of identical monomer mixtures were produced using 3.0 parts of sodium tridecyl ether sulfate as the emulsifier.

The polymerizations were conducted at 55° C., and the reactions were stopped after about 8 hours. The viscosity and total solids contents of the resulting latices were then determined and the results are shown in Table 3 below.

TABLE 3

| | 1 | 2 | 3 | 4 | 5 | 6 | 7 | 8 |
|---|---|---|---|---|---|---|---|---|
| Butadiene | (1) | 50 | 50 | 50 | 50 | 50 | 50 | 50 |
| Styrene | 48 | 48 | 48 | 50 | 48 | 48 | 48 | 50 |
| Fumaric acid | 2.0 | | | | 2.0 | | | |
| Itaconic acid | | 2.0 | | | | 2.0 | | |
| Methacrylic acid | | | 2.0 | | | | 2.0 | |
| Water | 125 | 125 | 125 | 125 | 125 | 125 | 125 | 125 |
| Na tridecyl ether sulfate | 3.0 | 3.0 | 3.0 | 3.0 | | | | |
| Mg lauryl sulfate | | | | | 3.0 | 3.0 | 3.0 | 3.0 |
| Ethylenediamine-tetraacetic acid | 0.02 | 0.02 | 0.02 | 0.02 | 0.02 | 0.02 | 0.02 | 0.02 |
| $K_2S_2O_8$ | 0.075 | 0.075 | 0.075 | 0.075 | 0.075 | 0.075 | 0.075 | 0.075 |
| Tertiary dodecylmercaptan | 0.7 | 0.7 | 0.7 | 0.7 | 0.7 | 0.7 | 0.7 | 0.7 |
| pH | 2.2 | 2.7 | 4.7 | 8.2 | 1.9 | 2.2 | 3.6 | 8.2 |
| Polymerization Temp., °C | 55 | 55 | 55 | 55 | 55 | 55 | 55 | 55 |
| Percent Total solids | 43.4 | 42.6 | 44.1 | 43.2 | 40.0 | 40.6 | 42.6 | 41.9 |
| Viscosity (centipoises): | | | | | | | | |
| 60 r.p.m | 2,800 | 2,400 | 4,300 | 3,500 | 24.4 | 17.5 | 15 | 10 |
| 12 r.p.m | 10,800 | 9,000 | 17,000 | 13,700 | 23 | 18 | 12 | 10 |

1 All amounts are parts by weight.

60° C. and the degree of conversion was essentially the same for all latices formed.

TABLE 2

| | 1 | 2 | 3 | 4 | 5 |
|---|---|---|---|---|---|
| Butadiene | 1 50.0 | 50.0 | 50.0 | 50.0 | 50.0 |
| Styrene | 48.0 | 48.0 | 48.0 | 48.0 | 48.0 |
| Fumaric Acid | 2.0 | 2.0 | 2.0 | 2.0 | 2.0 |
| Water | 125 | 125 | 125 | 125 | 125 |
| Na tridecyl ether sulfate | 4.0 | 3.0 | 2.0 | 1.0 | |
| Mg lauryl sulfate | | 1.0 | 2.0 | 3.0 | 4.0 |
| Total solids (percent) | 42.1 | 42.3 | 42.4 | 42.5 | 42.1 |
| Viscosity:2 | | | | | |
| 60 r.p.m | 2,800 | 1,500 | 105 | 55.8 | 20.5 |
| 6 r.p.m | 10,500 | 4,800 | 110 | 56 | 20.0 |
| Percent Conversion | 89.7 | 89.8 | 89.9 | 91.0 | 89.7 |

1 Parts by weight.
2 Centipoises.

Comparison of the latices made with the magnesium type emulsifier with those using the sodium type emulsifier shows a reduction in their viscosities of at least one hundred fold. Variations in the viscosity were recorded, due to the different monomeric mixtures, but the magnitude of the differences was of the same order. Furthermore, the latices of butadiene and styrene copolymers produced in the alkaline emulsions of Runs 4 and 8 exhibited reductions in viscosity comparable to those obtained with acid polymerization. This indicates the wide range of effectiveness of the polyvalent emulsifiers as to conditions of polymerization and monomer types.

EXAMPLE IV

The frequency of occurrence of the large size particles found in the latices produced by the use of the polyvalent emulsifiers is shown in this example. Two latices were prepared in accordance with the described general procedure at a polymerization temperature of 65° C. One latex was prepared from the recipe designated as No. 5 in Example III, and the other from a similar recipe except that 3.0 parts of sodium tridecyl ether sulfate as as emulsifier, 0.1 potassium persulfate as initiator, 0.02 part of the ethylenediaminetetraacetic acid and 150 parts of water were employed. The latex particle sizes and frequencies in percent of total latex particles are shown in Table 4 below.

TABLE 4

| Emulsifier | Particle Size (A.) | Occurrence (percent) |
|---|---|---|
| Na tridecyl ether sulfate | 300 | 16 |
| | 450 | 26 |
| | 600 | 24 |
| | 750 | 23 |
| | 900 | 11 |
| Mg lauryl sulfate | 1,200 | 44 |
| | 1,500 | 33 |
| | 1,800 | 17 |
| | 2,100 | 2 |
| | 2,400 | 1 |
| | 2,700 | 2 |
| | 3,000 | 1 |

The latex polymerized with polyvalent metal cations had 94 percent of its particles in the size range of 1200 to 1800 A. with the other 6 percent from 1800 to 3000 A. The latex polymerized with the sodium salt emulsifier had 84 percent of its particles of the size from 450 to 900 A. with 16 percent even smaller at 300 to 450 A. Thus, the foregoing tests again demonstrate the marked increase in particle size and size distribution in the latex made by the invention.

EXAMPLE V

Using the above-described general procedure and recipe, a terpolymer latex of butadiene, styrene and fumaric acid (BD/ST/FA 50/48/2) was prepared with 4.0 parts of magnesium dodecylbenzene sulfonate as the polyvalent metal emulsifier. Two latices were also prepared using sodium dodecylbenzene sulfonate as emulsifier and sodium tridecyl ether sulfate, respectively. Viscosity measurements on the resulting latices again establish the marked difference in fluidity produced by the use of the polyvalent emulsifiers of this invention. In fact, the latex made with the sodium dodecylbenzene sulfonate was too viscous to give a reading with the Brookfield viscometer. Table 5 below presents these data in more detail.

TABLE 5

| | 1 | 2 | 3 |
|---|---|---|---|
| Butadiene | 50.0 | 50.0 | 50.0 |
| Styrene | 48.0 | 48.0 | 48.0 |
| Fumaric acid | 2.0 | 2.0 | 2.0 |
| Water | 125 | 125 | 125 |
| Na tridecyl ether sulfate | 4.0 | | |
| Na dodecylbenzene sulfonate | | 4.0 | |
| Mg dodecylbenzene sulfonate | | | 4.0 |
| pH | 3.0 | | 2.5 |
| Percent total solids | 44.3 | | 43.0 |
| Viscosity:[1] | | | |
| 60 r.p.m | 3,820 | [2] | 72.0 |
| 12 r.p.m | 15,000 | [2] | 90 |

[1] Centipoises.
[2] Too viscous to measure.

Additional polymerization runs were made using various polyvalent emulsifiers as shown in Table 6, below. The polymerizations were conducted in accordance with the procedure indicated above, the specific recipe and conditions being noted in Table 6.

TABLE 6

| Run Number | 1 | 2 | 3 | 4 |
|---|---|---|---|---|
| Butadiene/Styrene/Fumaric acid | 46/52/2 | 46/52/2 | 46/52/2 | 46/52/2 |
| Water | 125 | 125 | 125 | 125 |
| Sodium tridecyl ether sulfate | 3.0 | | | |
| Calcium tridecyl ether sulfate | | 3.0 | | |
| Magnesium tridecyl ether sulfate | | | 3.0 | |
| Zinc lauryl sulfate | | | | 3.0 |
| Chelating agent—EDTA | 0.02 | 0.02 | 0.02 | 0.02 |
| Potassium persulfate | 0.15 | 0.15 | 0.15 | 0.15 |
| t-Hexadecyl mercaptan | 0.9 | 0.9 | 0.9 | 0.9 |
| Polymerization temperature: 50° C. | (Raised to 55° C. after first hour) | | | |
| Percent Conversion | 92.5 | 94.2 | 91.5 | 84.0 |
| Percent Total solids (before stripping) | 42.7 | 43.4 | 42.4 | |
| Percent Total solids (after stripping) | 41.2 | 50.0 | 53.5 | 45.0 |
| Viscosity (before stripping): | | | | |
| 60 r.p.m | 1,702 | 50 | 19.8 | |
| 6 r.p.m | 6,150 | 51.5 | 18 | |
| Viscosity (after stripping): | | | | |
| 60 r.p.m | 460 | 255 | 335 | 31 |
| 6 r.p.m | 640 | 836 | 1,270 | 26 |

The results shown in Table 6 establish that the bivalent metal salt emulsifiers provide much lower viscosities than the monovalent sodium salt emulsifier. The latex of Run 1 made with a sodium salt emulsifier was so viscous at 42.7% solids before stripping, that it was diluted to 41.2% in steam stripping the unreacted monomer to give a better working viscosity. On the other hand, the latices of Runs 2 and 3 because of their low initial viscosities were concentrated to 50% and 53.5% solids while maintaining adequate fluidity. The zinc salt emulsifier also provided very low viscosities at higher solids contents.

Electronmicrographs of samples of the resulting latices were analyzed for particle size and distribution with the results plotted in Table 7 below.

TABLE 7

| Run No. | Average Particle Size in Angstroms | | | | | | | | |
|---|---|---|---|---|---|---|---|---|---|
| | 1,000 | 1,250 | 1,500 | 1,750 | 2,000 | 2,250 | 2,500 | 2,750 | 3,000 |
| | Percent Distribution of Latex Particles | | | | | | | | |
| 1 | 35 | 54 | 11 | | | | | | |
| 2 | | | 14 | 67 | 19 | | | | |
| 3 | | | | 2 | 28 | 41 | 20 | 7 | 2 |
| 4 | | | | 12 | 42 | 38 | 8 | | |

As may be seen from Table 7 all of the latices made with bivalent metal salt emulsifiers had much larger particle sizes than those made with the conventional sodium salt emulsifiers.

Comparative tests run with tridecylether sulfate salts of a trivalent metal, aluminum, and a tetravalent metal, tin, established that the latex particle sizes were merely comparable to those of latex made with the sodium salt emulsifiers.

EXAMPLE VI

Using the emulsion polymerization procedure heretofore described in Example II, additional acidic terpolymers were prepared to illustrate the effects of the introduction of bivalent metal cations as an electrolyte on the viscosities of latices produced by the subject invention. The recipes used were substantially the same as those in Example II except that in some runs small amounts of magnesium sulfate were added in place of magnesium lauryl sulfate and the total amount of emulsifier was decreased to 3.0 parts. Polymerization was effected at 55° C. to produce latices having a total solids content ranging from about 39.5 to 42.7 percent with the degree of conversion being essentially the same for all the latices produced.

TABLE 8

| Run Number | 1 | 2 | 3 | 4 |
|---|---|---|---|---|
| Butadiene | 50 | 50 | 50 | 50 |
| Styrene | 48 | 48 | 48 | 48 |
| Fumaric Acid | 2 | 2 | 2 | 2 |
| Water | 125 | 125 | 125 | 125 |
| Na lauryl sulfate |  | 3 | 3 | 3 |
| Mg lauryl sulfate | 3 |  |  |  |
| $MgSO_4$ |  |  | 0.65 | 0.1 |
| Ethylenediamine-tetraacetic acid | 0.02 | 0.02 | 0.02 | 0.02 |
| Potassium persulfate | 0.075 | 0.075 | 0.075 | 0.075 |
| t-Dodecyl mercaptan | 0.7 | 0.7 | 0.7 | 0.7 |
| Polymerization temperature (° C.) | 55 | 55 | 55 | 55 |
| Percent total solids | 39.5 | 41.4 | 40.8 | 41.7 |
| Unstripped viscosity (centipoises): |  |  |  |  |
| 60 r.p.m | 29 | 2,430 | 19 | 850 |
| 12 r.p.m | 30 | 8,950 | 16 | 1,350 |
| Stripped [2] viscosity (centipoises): |  |  |  |  |
| 60 r.p.m | 16.6 | [3] 870 | 14.7 | 187.5 |
| 12 r.p.m | 16 | [3] 2,050 | 13 | 210 |

[1] Parts by weight.
[2] Latices stripped then concentrated or diluted to 40% total solids.
[3] Latex of Run 2 was stripped then diluted to 39.5% total solids.

Inspection of the data shown in Table 8 shows that the introduction of as little an 0.1 part of magnesium sulfate per 100 parts of monomer substantially reduced the viscosity of the latex prepared with 3.0 parts of sodium lauryl sulfate. Furthermore, introduction of 0.65 part of magnesium sulfate gave a latex having a viscosity of the same magnitude as that obtained in Run 1 which employed magnesium lauryl sulfate as the emulsifying agent.

EXAMPLE VII

To further illustrate the effect of introducing bivalent metal cations as electrolytes, additional polymerizations were conducted as described in Example II in which 5 parts of sodium lauryl sulfate or 5 parts of magnesium lauryl sulfate were used as emulsifiers and magnesium chloride was added at levels of 1, 3, and 7 parts per 100 parts of monomer.

containing sodium lauryl sulfate produced a latex having a particle size and viscosity comparable to those prepared using bivalent metal emulsifiers in accordance with the subject invention. In contrast, those latices prepared in Runs 2 and 3 with recipes containing 3 and 7 parts of the magnesium chloride showed a gel-like appearance and had viscosities that were excessive i.e., several hundred times greater than those obtained by the use of bivalent metal emulsifiers.

In those runs where 5 parts of magnesium lauryl sulfate were used as emulsifier, it will be noted that introduction of 1, 3, or 7 parts of magnesium chloride increased the viscosity of the resulting latices to a point where they would not be acceptable for the applications contemplated by the subject invention.

Comparative runs conducted with monovalent metal electrolytes, e.g., sodium sulfate, further established that latices having the comparable large particle sizes and low viscosities could be obtained with aqueous systems using bivalent metal emulsifiers, when the amount of electrolyte added to the aqueous system was less than 1.0 part per 100 parts of monomers.

TABLE 9

| Run Number | 1 | 2 | 3 | 4 | 5 | 6 |
|---|---|---|---|---|---|---|
| Sodium lauryl sulfate | 5 | 5 | 5 |  |  |  |
| Mg lauryl sulfate |  |  |  | 5 | 5 | 5 |
| $MgCl_2$ | 1 | 3 | 7 | 1 | 3 | 7 |
| Percent Conversion | 90.6 | 94.0 | 92.1 | 90.5 | 90.5 | 91.1 |
| Appearance | Fluid | [1] Gel | [1] Gel | [1] Gel | [1] Gel | [1] Gel |
| Percent Prefloc | Negl. | 15 | 8.7 | Negl. | 6.7 | 4.7 |
| Percent Total solids | 41.8 | 38.8 | 36.1 | 26.0 | 31.2 | 33.1 |
| Viscosity: |  |  |  |  |  |  |
| 60 r.p.m | 24.5 | 7,600 | 5,800 | 700 | 3,700 | 3,900 |
| 12 r.p.m | 30 | 10,500 | 7,000 | 2,000 | 2,250 | 3,750 |
| Percent Total solids (after stripping) | 40.0 | 28.8 | 23.7 |  |  |  |
| Viscosity (after stripping): |  |  |  |  |  |  |
| 60 r.p.m | 14 | 29 | 18 |  |  |  |
| 12 r.p.m | 20 | 75 | 55 |  |  |  |
| Particle size, A. (average) | 1,330 | 1,770 | 1,225 | 2,200 | 1,285 | 1,880 |

[1] Cottage cheese-like gel.

EXAMPLE VIII

The effect of varying the amount of bivalent metal emulsifier in the emulsion polymerization of unsaturated monomers is shown by this example. Several latices were prepared in accordance with the described general procedures at a polymerization temperature of 55° C.–60° C. with a recipe similar to that described in Example VI with the exception that 3.0 parts, 5.0 parts and 7.0 parts of magnesium lauryl sulfate per 100 parts of monomer were used without the addition of any bivalent metal cations as an electrolyte. Also, additional latices were prepared with similar recipes using sodium lauryl sulfate as an emulsifier. The average particle sizes for the latices obtained are shown in Table 10 below.

TABLE 10

| Run Number | 1 | 2 | 3 | 4 | 5 | 6 |
|---|---|---|---|---|---|---|
| Sodium lauryl sulfate |  |  |  | 3 | 5 | 7 |
| Mg lauryl sulfate | 3 | 5 | 7 |  |  |  |
| $MgCl_2$ |  |  |  |  |  |  |
| Percent Conversion | 92.5 | 99.9 | 92.9 | 92.9 | 92.8 | 91.9 |
| Appearance | Fluid | Fluid | Fluid | Visc. | [1] s.v. | [1] s.v. |
| Percent Prefloc | Negl. | Negl. | Negl. | 2.5 | 1.1 | Negl. |
| Percent Total solids | 42.8 | 42.4 | 43.5 | 41.7 | 42.5 | 42.5 |
| Viscosity: |  |  |  |  |  |  |
| 60 r.p.m | 39 | 36.0 | 24.5 | 1,860 | 1,420 | 1,040 |
| 12 r.p.m | 35 | 35.0 | 22.5 | 6,900 | 3,900 | 1,800 |
| Percent Total solids (after stripping) | 39.5 | 39.0 | 39.5 | 39.7 | 40.2 | 40.4 |
| Viscosity (after stripping): |  |  |  |  |  |  |
| 60 r.p.m | 13.5 | 15 | 14.0 | 200 | 210 | 275 |
| 12 r.p.m | 27.4 | 12.5 | 15.0 | 250 | 300 | 325 |
| Particle size, A. (average) | 1,725 | 1,450 | 1,130 | 769 | 770 | 751 |

[1] Slightly viscous.

As shown in Run 1 in the table above, introduction of one part of magnesium chloride in the aqueous emulsion From the above data, it can be seen that the particle sizes of the latices decrease as the amount of emulsifier is increased and that at 7.0 parts of magnesium lauryl sulfate the particle size is still above 1,000 A., which is a particle size preferred for the purposes of this invention.

EXAMPLE IX

Additional latices were prepared in a number of runs as outlined in Example VII with the exception that 0.1 parts of magnesium chloride was added to the polymerization system as an electrolyte and the amount of emulsifier was varied up to 10 parts per 100 parts of monomer. The results of these runs are shown below in tabular form.

TABLE 11

| Run Number | 1 | 2 | 3 | 4 | 5 | 6 | 7 | 8 |
|---|---|---|---|---|---|---|---|---|
| Sodium lauryl sulfate | 3 | 5 | 7 | 10 | | | | |
| Mg lauryl sulfate | | | | | 3 | 5 | 7 | 10 |
| MgCl₂ | 0.1 | 0.1 | 0.1 | 0.1 | 0.1 | 0.1 | 0.1 | 0.1 |
| Percent Conversion | 91.6 | 93.0 | 93.3 | 90.9 | 89.4 | 92.8 | 93.5 | 92.4 |
| Appearance | ¹v. | ²s.v. | ²s.v. | ²s.v. | ³F. | ³F. | ³F. | ³F. |
| Percent Prefloc | 3.0 | 1.85 | Negl. | Negl. | Negl. | Negl. | Negl. | Negl. |
| Percent Total solids | 41.6 | 42.5 | 43.2 | 42.6 | 40.4 | 42.4 | 43.1 | 43.4 |
| Viscosity: | | | | | | | | |
| 60 r.p.m. | 1,040 | 480 | 430 | 405 | 23 | 18 | 18.5 | 33 |
| 12 r.p.m. | 2,600 | 650 | 500 | 375 | 40 | 25 | 35 | 37.5 |
| Percent Total solids (after stripping) | 40.4 | 39.8 | 40.3 | 40.1 | 40.0 | 39.8 | 38.8 | 40.6 |
| Viscosity (after stripping): | | | | | | | | |
| 60 r.p.m. | 195 | 57 | 58 | 38.5 | 16.5 | 10.5 | 10.5 | 9.5 |
| 12 r.p.m. | 187 | 62.5 | 30 | 27.5 | 20 | 12.5 | 12.5 | 7.5 |
| Particle size, A. (average) | 811 | 837 | 840 | 659 | 1,850 | 1,620 | 989 | 965 |

¹ Viscous.
² Slightly viscous.
³ Fluid.

It will be seen from the above data that the amount of emulsifier used in the emulsion polymerization of unsaturated monomers is critical for the purposes of this invention. The terpolymer latices prepared in Runs 5, 6 and 7 using 3, 5 and 7 parts of magnesium lauryl sulfate per 100 parts of monomer, respectively, had average particle sizes of 1850 A., 1620 A., and 989 A. in diameter, respectively, In contrast, the terpolymer latex prepared in Run 8 in which 10 parts of magnesium lauryl sulfate per 100 parts of monomer were used only had an average particle size of 625 A. in diameter. This reduced particle size is comparable with that obtained in Run 4 using the same amount of sodium lauryl sulfate and is smaller than the particle sizes obtained in Runs 1, 2 and 3 in which 3, 5 and 7 parts of sodium lauryl sulfate, respectively, were used.

It will therefore be recognized that the amount of bivalent metal emulsifier used must be kept within certain limits, i.e., from about 0.5 part to about 7.0 parts per 100 parts of monomer. Preferably from about 0.5 to about 5.0 parts of the emulsifier per 100 parts of monomer are employed to insure that the resulting latices have the larger particle sizes, i.e., from 1000 A. to 3000 A. in diameter or higher.

The examples set forth above are merely illustrative of the different bivalent metal emulsifiers or surfactants that may be used to increase the particle size and reduce the viscosity of synthetic latices, and as previously indicated other bivalent metal anionic surfactants may be used as emulsifiers for the emulsion polymerization of the invention.

The specific monomers and mixtures thereof employed in the examples are merely representative of the various ethylenically unsaturated compounds that may be polymerized in aqueous emulsions formed with polyvalent metal salt emulsifiers and many other unsaturated monomers, as indicated above, may be polymerized by the process of this invention.

It will further be understood, that the operating conditions and procedures, the various additives and monomers used in the emulsion polymerization according to the invention may be varied as will be apparent to those skilled in the art without departing from the spirit and scope of the invention.

What is claimed is:

1. A process for producing a synthetic polymer latex having low viscosity and large particle size which comprises effecting polymerization of a monomeric material comprising a mixture of at least one polymerizable aliphatic conjugated diolefin and at least one monoolefinically unsaturated compound copolymerizable with said diolefin, in an aqueous emulsion containing cations of a bivalent metal in Group II of the Periodic Table and an anionic surfactant to a conversion of from about 84 to about 98 percent, said emulsion being prepared from an aqueous medium by the addition of material selected from the group consisting of an emulsifier comprising a soluble salt of said bivalent metal and said anionic surfactant or a soluble inorganic salt of the bivalent metal and an emulsifier comprising a soluble salt of a metal other than said bivalent metal and the anionic surfactant, the amount of emulsifier in said emulsion being in an amount from 0.5 to 7.0 parts per 100 parts of monomeric material and the amount of inorganic salt added being in an amount not greater than 1.0 parts per 100 parts of monomeric material, but sufficient to ensure that the low viscosity and large particle size of the latex is obtained.

2. The process of claim 1 in which the bivalent metal salt is a salt of a sulfuric acid ester having the following general formula:

$$M(SO_3O[A]_nR)_x$$

wherein M is a bivalent metal, $x$ is 2; A is a radical selected from the group consisting of —CH₂CH₂O—, —CH₂CHOHCH₂OOC—, and —R'NHOC— (R' being an alkylene group containing from 1 to 20 carbon atoms), $n$ is an integer from 0 to 50, $n$ being 1 when A is selected from the group consisting of —CH₂CHOHCH₂OOC— and —R'NHOC—, and $n$ being an integer from 1 to 50 when A is —CH₂CH₂O—, and R is selected from the group consisting of alkyl alkylaryl, and dialkylaryl in which the alkyl groups contain from 8 to 20 carbon atoms.

3. The process of claim 1 in which the bivalent metal salt is a salt of an alkylaryl sulfonic acid having the following general formula:

$$M(SO_3[B]_yR_1)_x$$

wherein M is a bivalent metal; $x$ is 2; B is —CH₂CH₂O—; $y$ is an integer from 0 to 50; and $R_1$ is an alkylaryl group, the alkyl portion of which contains from 8 to 20 carbon atoms.

4. The process of claim 1 in which the anionic surfactant is an alkyl sulfate in which the alkyl group has at least 8 carbon atoms.

5. The process of claim 1 in which the anionic surfactant is an alkyl polyalkylene ether sulfate in which the alkyl group has at least 8 carbon atoms.

6. The process of claim 1 in which the anionic surfactant is an alkylaryl sulfonate in which the alkyl group has at least 8 carbon atoms.

7. The process of claim 1 in which the emulsifier is a lauryl sulfate of said bivalent metal.

8. The process of claim 1 in which the emulsifier is a dodecyl benzene sulfonate of said bivalent metal.

9. The process of claim 1 in which the emulsifier is a tridecyl ether sulfate of said bivalent metal.

10. The process of claim 1 in which the bivalent metal is selected from the group consisting of calcium, magnesium and zinc.

11. The latex of claim 16 in which the particle size ranges from about 1000 A. to about 3000 A. or higher in diameter and the viscosity before stripping is from about 10 to about 100 centipoises as determined by a Brookfield viscometer at a spindle speed of 60 r.p.m.

12. The process of claim 1 in which the monomeric material also contains an ethylenically unsaturated carboxylic acid monomer different from said monoethylenically unsaturated monomer.

13. The process of claim 1 in which the aqueous medium contains a concentration of the soluble inorganic salt of the bivalent metal in the range of from about 0.4 to about 0.85 parts per 100 parts of monomeric material.

14. The process of claim 1 in which said aqueous medium also contains a chelating agent in an amount ranging from about 0.01 to about 0.05 parts per 100 parts of monomeric material.

15. The process of claim 1 in which the emulsion is prepared from an aqueous medium by the addition of an emulsifier consisting essentially of a soluble salt of said bivalent metal and said anionic surfactant.

16. A synthetic polymer latex having low viscosity and large particle size which comprises an aqueous emulsion of a polymer prepared by polymerization of a monomeric material comprising at least one polymerizable aliphatic conjugated diolefin and at least one monoolefinically unsaturated compound copolymerizable with said diolefin, in an aqueous emulsion containing cations of a bivalent metal in Group II of the Periodic Table and an anionic surfactant to a conversion of from about 84 to about 98 percent, said emulsion having been prepared from an aqueous medium by the addition of materials selected from the group consisting of an emulsifier comprising a soluble salt of said bivalent metal and said anionic surfactant, or a soluble inorganic salt of bivalent metal and an emulsifier comprising a soluble salt of metal other than said bivalent metal and the anionic surfactant, the amount of emulsifier in said emulsion being an amount from 0.5 to 7.0 parts per 100 parts of monomeric material and the amount of inorganic salt added being an amount not greater than 1.0 parts per 100 parts of monomeric material, but sufficient to ensure that a low viscosity and large particle size of the latex is obtained.

17. The latex of claim 16 in which said monomeric material also contains an ethylenically unsaturated carboxylic acid monomer different from said monoethylenically unsaturated monomer.

18. The latex of claim 16 in which said emulsion is prepared from an aqueous medium by the addition of an emulsifier consisting essentially of a soluble salt of said bivalent metal and said anionic surfactant.

References Cited

UNITED STATES PATENTS

| | | | |
|---|---|---|---|
| 3,055,855 | 9/1962 | Anderson et al. | |
| 2,615,010 | 10/1952 | Troyan | 260—85.1 |

FOREIGN PATENTS 611,829  4/1947  Great Britain.

MURRAY TILLMAN, *Primary Examiner.*

W. J. BRIGGS, SR., *Assistant Examiner.*

U.S. Cl. X.R.

117—155; 260—2.5, 78.5, 82.1, 80.7, 82.3, 83.7

UNITED STATES PATENT OFFICE
CERTIFICATE OF CORRECTION

Patent No. 3,432,455 March 11, 1969

Vincent M. Rasicci

It is certified that error appears in the above identified patent and that said Letters Patent are hereby corrected as shown below:

Column 3, line 72, "his invention" should read -- this invention --. Columns 5 and 6, TABLE 1, in the heading to the fourth column, line 3 thereof, "7.9 E.O" should read -- 7.0 E.O --; same table, sixth column, line 3 thereof, "29,000" should read -- 20,000 --. Column 6, line 51, "latext" should read -- latex --. Columns 7 and 8, TABLE 3, second column, line 1 thereof, "(1)" should read -- (1)50 --. Column 11, TABLE 8, second column, line 1 thereof, "50" should read -- (1)50 --. Columns 11 and 12, TABLE 10, second column, line 12 thereof, "27.4" should read -- 27.5 --; same table, third column, line 4 thereof, "99.9" should read -- 90.0 --; same table, fourth and fifth columns, line 3 thereof, "92.9", each occurrence, should read -- 92.0 --. Columns 13 and 14, TABLE 11, fourth column, line 11 thereof, "58" should read -- 48 --; same table, ninth column, line 13 thereof, "965" should read -- 625 --.

Signed and sealed this 31st day of March 1970.

(SEAL)
Attest:

EDWARD M. FLETCHER, JR.
Attesting Officer

WILLIAM E. SCHUYLER, JR.
Commissioner of Patents